United States Patent [19]

Zuck

[11] 4,002,351

[45] Jan. 11, 1977

[54] FOLDING BICYCLE

[76] Inventor: Daniel R. Zuck, 14273 Beaver St., San Fernando, Calif. 91342

[22] Filed: Mar. 17, 1972

[21] Appl. No.: 235,532

[52] U.S. Cl. .............................. 280/278; 280/273; 297/243; 403/DIG. 4

[51] Int. Cl.² ..................... B62K 3/14; B62K 15/00

[58] Field of Search ......... 280/278, 287, 231, 7.11, 280/7.16, 273, 209; 287/DIG. 8, DIG. 9; 297/378, 243

[56] References Cited

UNITED STATES PATENTS

| 580,665 | 4/1897 | Goshorn | 287/DIG. 9 |
|---|---|---|---|
| 599,859 | 3/1898 | McFadden | 280/7.16 |
| 640,680 | 1/1900 | Merrow | 280/287 |
| 1,549,632 | 8/1925 | Trester | 287/DIG. 8 |
| 1,703,969 | 3/1929 | Syvrd | 297/378 |
| 2,227,252 | 12/1940 | Giambra | 280/7.11 |
| 2,601,824 | 7/1952 | Hauer | 287/DIG. 9 |
| 2,708,587 | 5/1955 | Zuck | 280/278 |
| 2,947,243 | 8/1960 | Ballou | 287/DIG. 9 |
| 3,092,362 | 6/1963 | Walsh | 280/231 |
| 3,191,965 | 6/1965 | Wilkens | 280/231 |
| 3,472,545 | 10/1969 | Berkowitz | 287/DIG. 8 |

FOREIGN PATENTS OR APPLICATIONS

| 478,680 | 10/1915 | France | 280/287 |
| 1,025,797 | 4/1953 | France | 287/DIG. 8 |
| 935,550 | 6/1948 | France | 280/273 |
| 1,415,802 | 9/1965 | France | 280/278 |
| 948,152 | 7/1949 | France | 280/273 |
| 85,185 | 2/1896 | Germany | 280/287 |
| 2,038,816 | 3/1971 | Germany | 280/287 |
| 115,469 | 12/1945 | Sweden | 297/378 |

Primary Examiner—M. H. Wood, Jr.
Assistant Examiner—Jack D. Rubenstein

[57] ABSTRACT

This invention relates to an improvement in folding girl's and tandem bicycles. The improvement expands the capability of bicycle folding means into girl's and tandem model configurations and provides a commonality of construction which can be incorporated into men's model configurations. The improvement disclosed is a detent for retaining the articulated latches securely locked thereby avoiding inadvertant release when the bicycle is ridden. An eccentric adjustment is provided to adjust out the looseness in the folding joints to overcome the problems of manufacturing tolerances and normal wear. Also disclosed is a tandem style which is no larger than the single rider model, except that it has provisions for a tandem seat and a tandem set of pedals.

3 Claims, 11 Drawing Figures

FOLDING BICYCLE

This invention relates to and has for its object the improvement of folding bicycles in the girl's model configuraton and the creation of a folding, two-passenger dual bicycle, having a tandem model configuration.

Another object is to provide positive locking means on the locking latches which hold the bicycle unfolded in the normally ridden configuration.

Another object of this invention is to provide a folding frame assembly in a girl's model configuration.

Another object of this invention is to provide a folding bicycle for tandem riders with a dual set of pedals which bicycle can be folded into an envelope substantially the size of the standard single girl's or boy's bicycle configuration.

Another object of this invention is to provide a frame assembly, seat assembly, and a dual pedal assembly for tandem riders and a tandem bicycle seat in a normal size single-rider type bicycle.

Another object of this invention is to provide a girl's bicycle frame assembly with frame folding means whereby the substantially vertical member serving as a spreader bar between the rear fork means supports the rider's seat means, and said vertical frame member is separated and is not structurally integrated with the rear folding fork means.

Another object of this invention is to provide a girl's bicycle frame configuration and tandem dual-rider bicycle frame configuration that can be folded easily without disassembly or separation of the frame into separate assemblies when the bicycle is folded, thereby making the folded bicycle easy to handle and store and transport aboard airplanes, in automobiles, in boats, and to store and to shelter the bicycle in apartments, etc.

Another object of this invention is to provide a bicycle that can be folded easily into a package envelope approximately square and substantially in base dimensions a little greater than the diameter of one of its wheels.

Another object of this invention is to provide a bicycle that can be folded and unfolded easily and in a minimum time. Tests have shown that this bicycle herein dis-closed can be folded in 10 seconds and unfolded and ready to ride in 10 seconds.

Another object of this invention is to provide positive adjustment means and positive locking means to secure the latches of the folding frame means when the bicycle is being ridden.

Another object of this invention is to provide a commonality of parts for men's and girl's folding bicycle frame configurations.

How the foregoing objects and advantages are secured, together with others which will occur to those skilled in the art, will be more apparent from the following description making reference to the accompanying drawings, in which.

This invention is related to my prior patent, U.S. Pat. No. 2,708,587 for a folding bicycle.

The above said folding bicycle prior patent was limited to a men's style frame configuration because of the inherent arrangement of the frame structural members in their relation to the folding elements of the bicycle frame assembly. While the said patent taught the folding of a men's bicycle frame assembly, a girl's folding bicycle frame assembly could not be constructed. The narrow useage and utility of the above exclusive teaching in men's folding bicycles of the said patent greatly inhibited the sale of folding bicycles because of its limited model configurations and utilization.

The teaching of this patent disclosure application expands the folding bicycle model configurations into the girl's frame model configuration and into the tandem dual-rider model configuration, and also provides commonality and improvements for the men's folding bicycle configuration.

The teaching of this patent disclosure application provides an improved latching means as opposed to the latching means described in above said U.S. Pat. No. 2,708,587, column 2 in the last paragraph which describes the latch as follows: "A tight friction fit with closely controlled tolerances in the manufacturing of latches 18, 22, and 24 and the associated mating parts has proved adequate to maintain these latches in the locked position. In the manufacture of latches 18, 22, and 24 a very slight interference at the start of engagement with the studs 43, 55, and 58 may be used to further ensure retaining of the latches in the locked position when the bicycle is unfolded."

In actual manufacturing practice it was impossible to control the tolerances to maintain the friction necessary to keep the latches securely locked. In addition normal service wear caused the slight interference to be worn away causing the latches to come loose during the riding of the bicycle and allowing the bicycle to fold up when it was ridden which has resulted in serious accidents.

Figure 9:
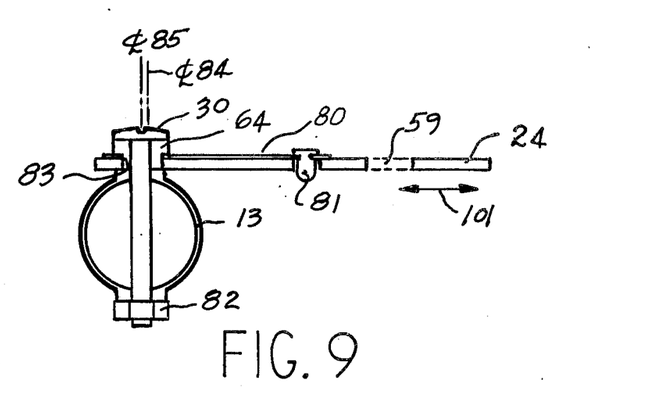
FIG. 9 is a sectional view taken on line 9—9 in FIG. 4A showing the locking detent and eccentric adjustment.

The eccentric adjustment screw 64 shown in FIG. 9 is disclosed as a means to preset and preadjust the latch clearance during initial assembly and during service.

The detent 81 by means of spring 80 safely secures the latch against inadvertent release when the bicycle is being ridden.

Figure 1:
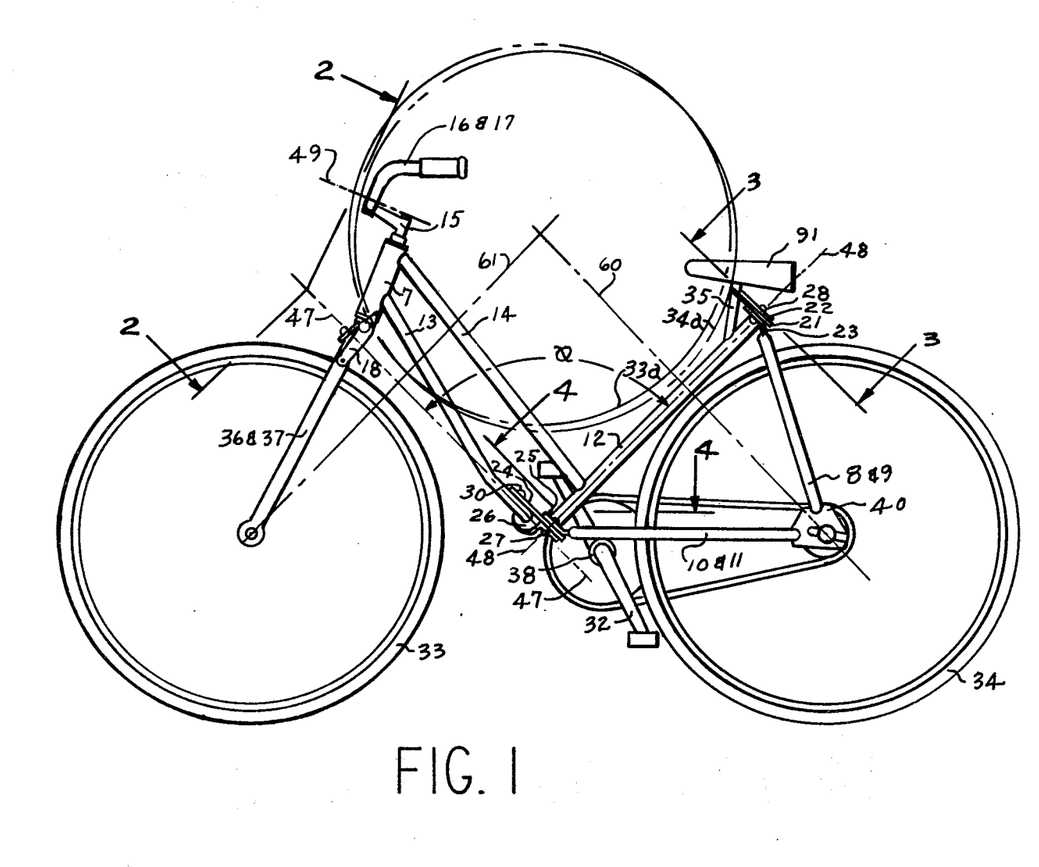
FIG. 1 is a side elevation view of a folding bicycle showing the position of the wheels in the unfolded and folded position.

As shown in FIG. 1 this folding bicycle is comprised substantially of a main frame body assembly, a rear wheel fork assembly, a front wheel fork assembly, and a handle bar assembly.

The rear wheel fork assembly is comprised of tubes 8 and 9, tubes 10 and 11, pedal assembly 32, crank housing 38, crank hanger 39, lower folding pivot fitting 25, upper folding pivot fitting 23, and rear wheel hanger fitting 40, leaf spring 62, detents 81 eccentric adjustment nuts 64, and latches 22 and 24.

The main frame body assembly is comprised of tube 14, the vertical tube 12 serving the frame assembly as a rear spreader bar means hingedly attaching to the rear wheel forks, tube 13, front fork bearing housing 7, seat post 35, upper folding hinge fitting 21, and lower folding hinge fitting 26.

The front wheel fork assembly is comprised of tube 36, tube 37, latch 18, front fork caster assembly 19, and tube 41.

The handle bar assembly is comprised of stem 15, center section 52, hinge fitting 51, hinge fitting 50, and handle bars 16 and 17. Latches 64 and 66 are provided to secure the handle bars in the normal configuration for riding the bicycle.

Figures 2, 5, 6:
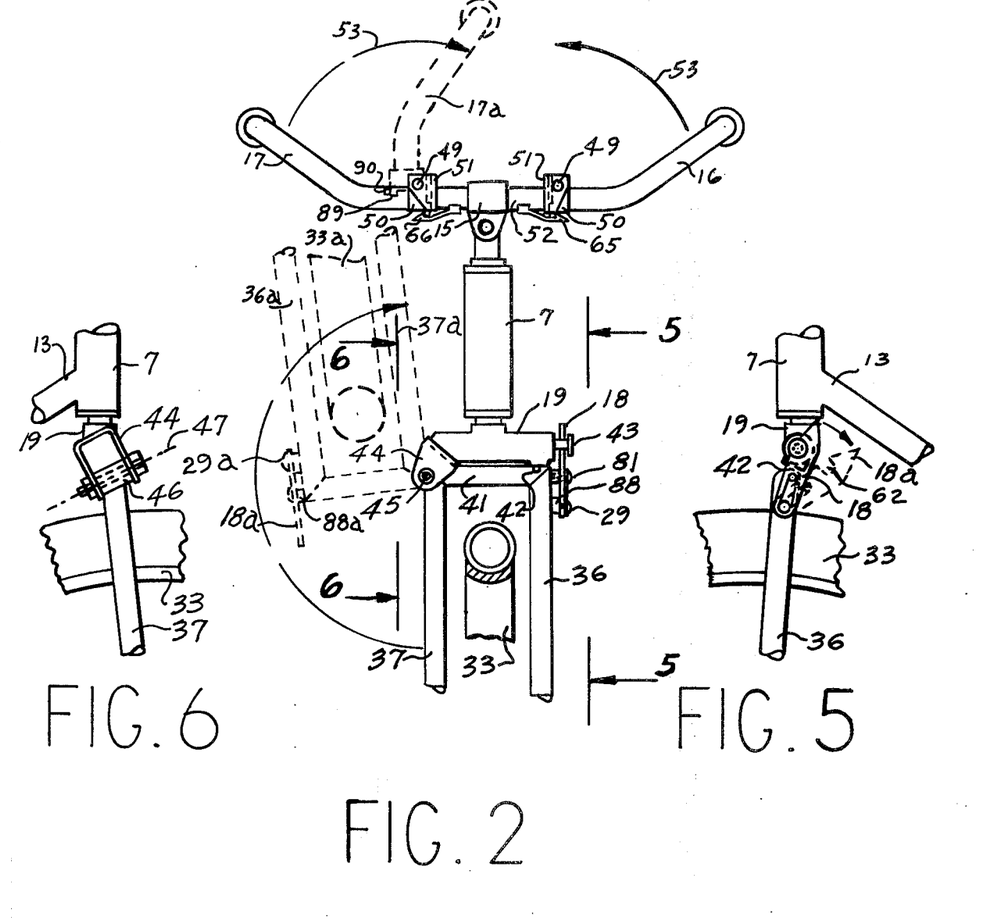
FIG. 2 is a sectional view taken on the line 2—2 of FIG. 1 showing the folding of the handle bars and front wheel fork.
FIG. 5 is a fragmental view taken on line 5—5 of FIG. 2 showing the latch which when released allows the front wheel fork to fold.
FIG. 6 is a fragmental view taken on line 6—6 of FIG. 2 showing the hinge line on which the front wheel fork assembly pivots when the fork is folded.
Figure 3:
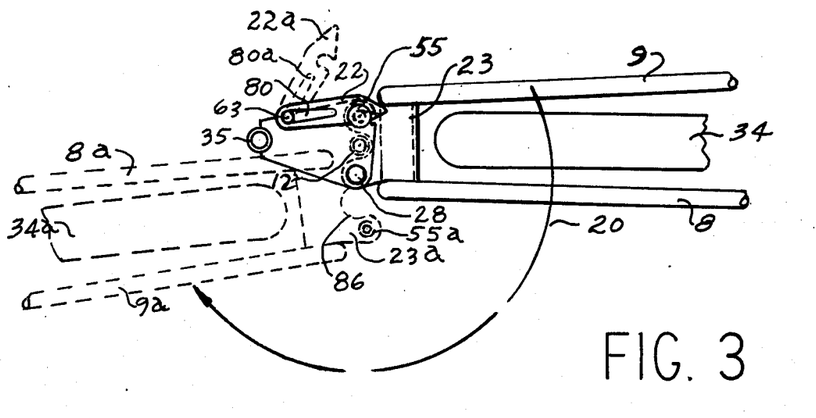
FIG. 3 is a sectional view taken on line 3—3 of FIG. 1 and FIG. 7 showing the rear wheel fork assembly latched to the upper frame body in the unfolded position and unlatched and in the folded position as indicated by the broken lines.
Figure 4:
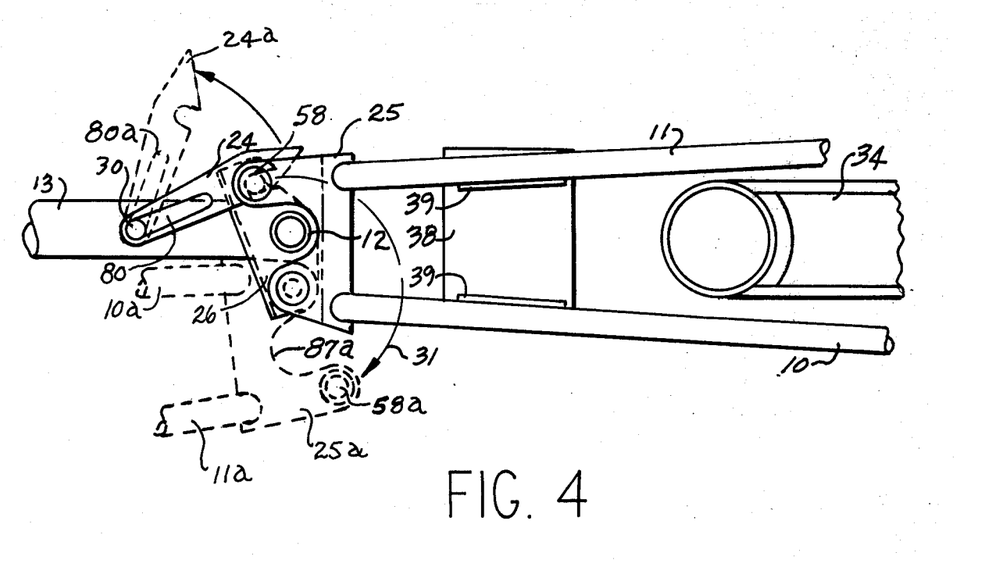
FIG. 4 is a sectional view taken on line 4—4 of FIG. 1 and FIG. 7 showing the rear wheel fork assembly and lower frame body in the latched position and in the folded position as indicated by the broken lines.

The bicycle unfolded ready for riding appears as shown in FIG. 1 solid lines, FIG. 2 solid lines, FIG. 3 solid lines, FIG. 4 solid lines, FIG. 5 and FIG. 6.

To fold the bicycle the handle bars 16 and 17 are moved, after releasing latches 65 and 66, in the direction indicated by arrows 53, on pivot axis 49 in FIG. 2; latch 18, FIG. 5 is moved to position 18a about pintle 29; this frees flanged stud 43 on caster assembly 19 and front wheel and fork assembly, 41, 36, and 37 are free to pivot about pivot axis 47 on bolt 45 and hinge fitting 46. The front fork folded position is indicated by broken lines in FIG. 2, 36a, 37a, and 41a. Latches 22 and 24 FIG. 1 are moved to position 22a and 24a about pintles 63 and 30 respectively in FIGS. 3 and 4. This frees the rear fork assembly to pivot on pivot axis 48 on hinge pins 27 and 28. The folded position of the rear fork assembly is indicated by broken lines 8a and 9a, 10a and 11a, and is also indicated by arrows 20 and 31 in FIGS. 3 and 4. Like members with the suffix a indicate the parts of the bicycle in their respective positions when the bicycle is folded.

Figure 3A:
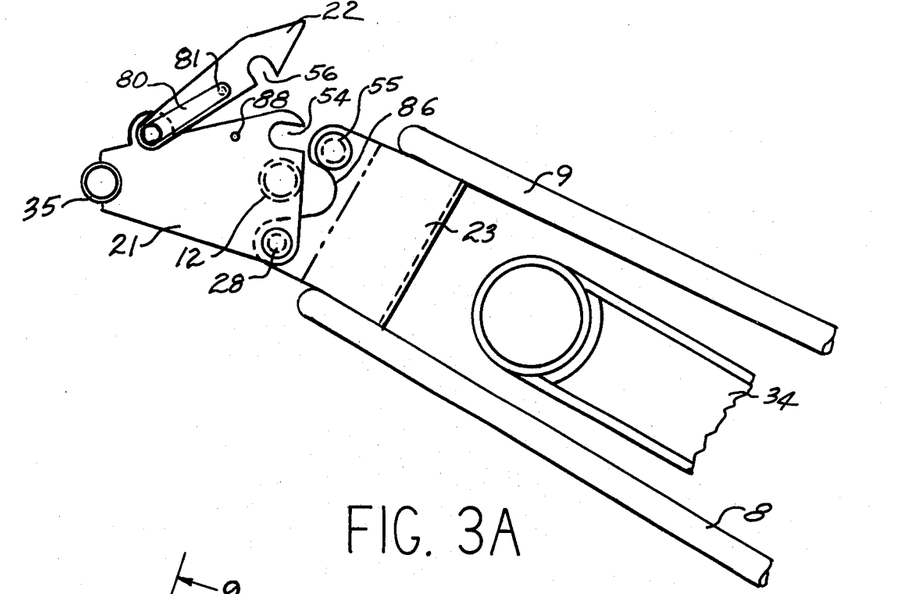
FIG. 3A is an enlarged sectional view taken on line 3—3 of FIG. 1 and FIG. 7 showing the rear wheel fork assembly unlatched from the frame body.

As shown in FIG. 3A, fitting 21 has a slot 54 which receives flanged stud 55. Latch 22 also has a slot 56 which functions as a hook and which engages stud when said stud 55 is rotated into slot 54. Latch 22 then securely locks the rear fork assembly to the upper main frame body in the unfolded position.

Figure 4A:
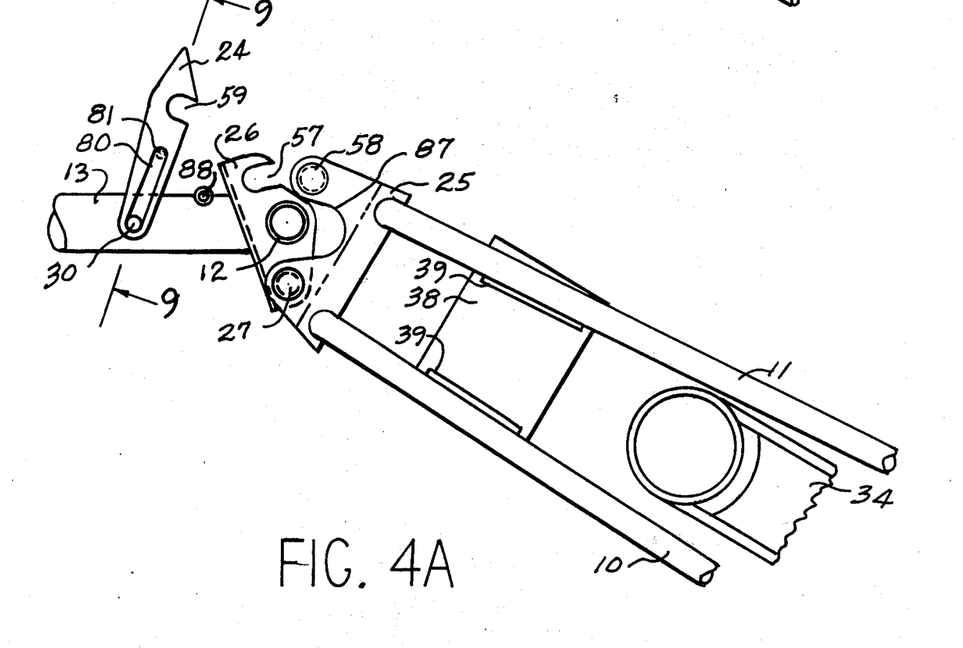
FIG. 4A is a sectional view taken on line 4—4 of FIG. 1 and FIG. 7 showing the rear wheel fork assembly unlatched from the lower frame body.

Also, as shown in FIG. 4A, fitting 26 has a slot 57 which receives the flanged stud 58. Latch 24 also has a slot 59 which functions as a hook and which engages stud 58 when said stud 58 is rotated into slot 57. Latch 24 then securely locks the rear fork assembly to the lower main frame body in the unfolded position.

As shown in FIG. 5 the latch 18 has a slot 62 which engages stud 43 shown in FIG. 2 and holds the front fork assembly securely locked against bumper 42 in the unfolded position.

The centerline of the axle of the rear wheel travels on a plane designated by line 60, FIG. 1 when the rear wheel fork assembly is rotated toward the folded position about pivot axis 48.

The centerline of the axle of the front wheel travels on the plane designated by line 61, FIG. 1 when the front fork assembly is rotated toward the folded position about pivot axis 47.

In the folded position the front wheel occupies the position at 33a, and the rear wheel occupies the position at 34a, FIG. 1, adjacent each other with the frame body, the folded handle bars, and the seat nested between the front and rear wheels.

The essence of compactly folding this bicycle is the angular interrelation of the folding pivot axes 47 and 48 of the front and rear fork assemblies. This angle on the bicycle of FIG. 1 is substantially 90°, said angle need not necessarily be 90° to accomplish substantially the object which I have demonstrated.

Figure 7:
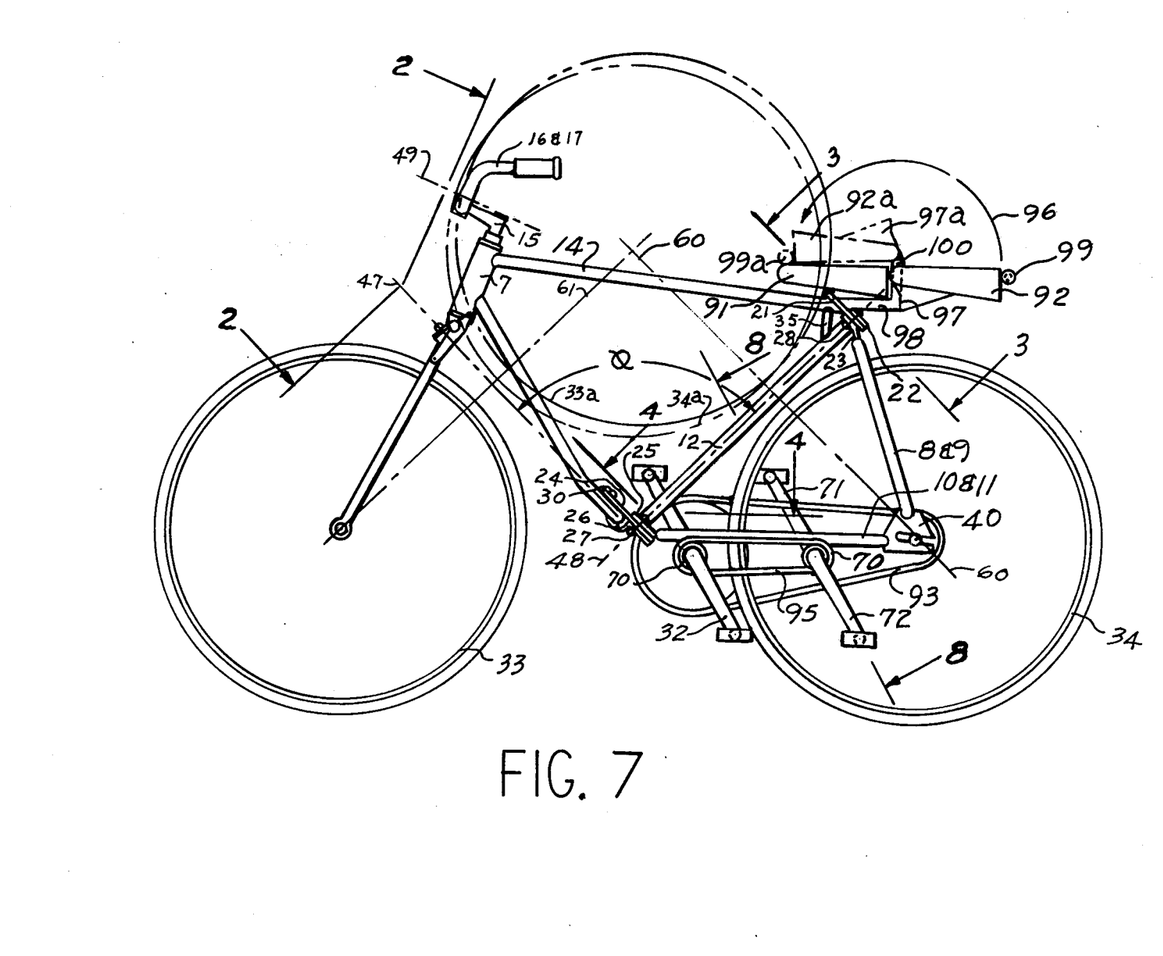
FIG. 7 is a view of a tandem bicycle configuration with two seats for the riders and two sets of pedals.
Figure 8:
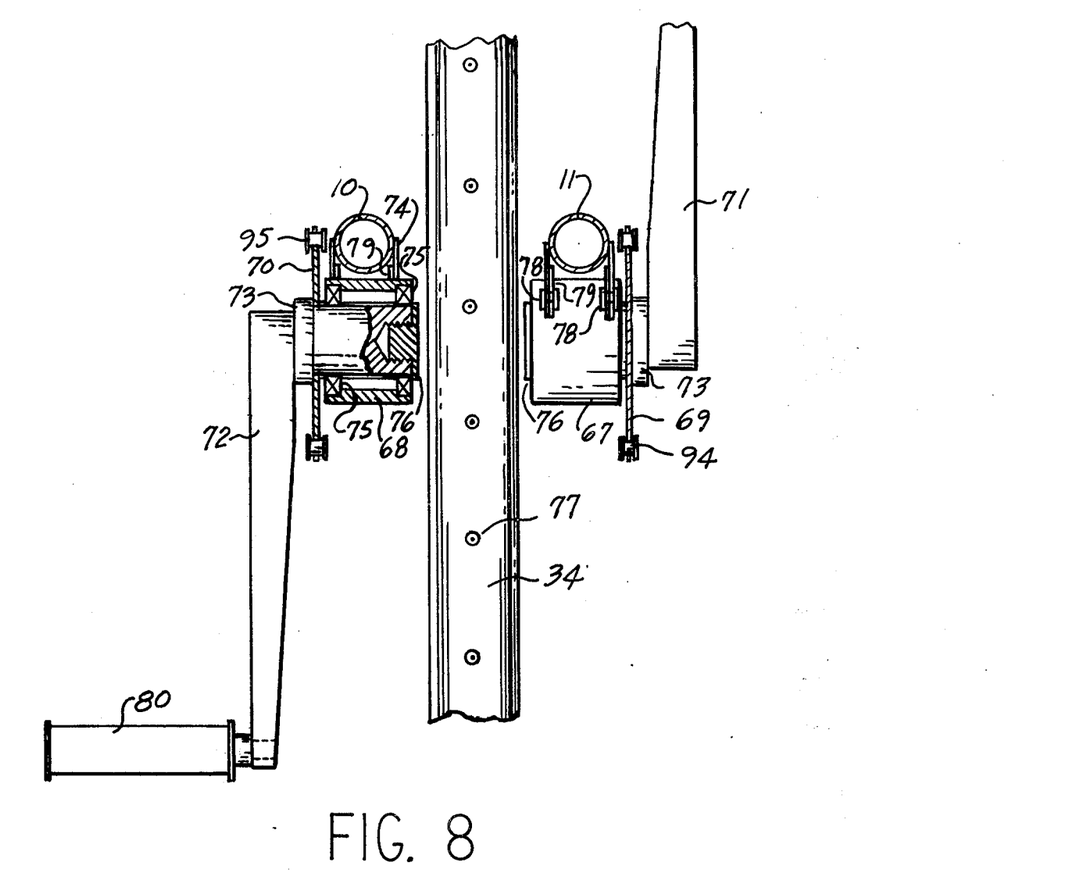
FIG. 8 is a sectional view taken on line 8—8 in FIG. 7 showing the pedal assembly for the aft rider.

As shown in FIG. 7 the dual tandem bicycle is comprised substantially of a main frame body assembly illustrated in a men's configuration, a front wheel fork assembly, a handle bar assembly, and a rear wheel fork assembly. The rear wheel fork assembly has a dual set of pedal assemblies, the aft set of which is shown in FIG. 8. A dual seat configuration in FIG. 7 is also shown which may be folded forward to the 92a folded position about pintle 100. Aside from the dual pedal assembly and the dual seats the dual tandem bicycle, except for the tubes 14 in FIGS. 1 and 7, has all parts in common or they are similar to the parts shown in the girl's bicycle in FIG. 7. Tube 14 in FIG. 1 is not similar to tube 14 in FIG. 7 but performs a similar structural function to support the rear folding hinge axis and latching means.

Since there is the similarity of parts in FIGS. 1 and 7 as noted in the above paragraph the description of the dual tandem bicycle in FIG. 7 is identical to the description of the girl's model bicycle in FIG. 1 as described above beginning with line 11 on page 4 and continuing through line 4 on page 6 except as noted as follows: In FIG. 7 Tube 14 is horizontal and interconnects fork journal 7 and seat post 35 and fitting 21. Extending aft from tube 14 and fitting 21 is a tandem seat support fitting 98 which includes a horizontal pintle 100 to which tandem seat 92 is hinged. The horizontal pintle 100 must be on a level with or above the forward seat 91 and tandem seat 92 to allow the tandem seat 92 to fold on top of the forward seat 91 when the bicycle is folded. Seat 92 has a downward extending stop 97 which prevents the seat 92 from rotating downward when it is carrying a tandem rider. Aft of the seat 92 is a cross bar 99 which provides a hand grip for the tandem rider to grip when he rides the bike.

The tandem seat 92 is folded in the direction of arrow 96 and takes the position indicated at 92a, 99a, and 97a in FIG. 7. The tandem seat 92 rotates about the pintle 100 when it is folded as shown by the arrow 96. It takes a position between the two wheels 33a and 34a when the bicycle is folded.

In FIG. 7 to tubes 10 and 11 are attached pedal housing 67 and 68 shown in FIG. 8 by means of fittings 74 and 79. These housings support the aft pedal arms 71 and 72 in FIG. 7 provided for the tandem rider. The aft pedals 80 are attached to the lever arms 71 and 72. Each pedal assembly 71 and 72 is separately interconnected to the front pedal crank 32 by separate chains 94 and 95 by means of chain sprockets 69 and 70 in FIG. 8. In FIG. 7 there are like chain sprockets 69 and 70 interconnected to the forward pedal crank 32 to which the pedal torque produced by the tandem rider from the aft pedal housings 67 and 68 is delivered.

The aft pedal housings 67 and 68 and tension of chains 94 and 95 are adjustable fore and aft through the adjustment screws 78 and slots in mating fittings 74 and 79 shown in FIG. 8. The pedal crank 72 is secured to the chain sprocket 70 journal 73 which protrudes through housing 75 and is supported in the housing 68 by the bearings 75. A thrust nut 76 retains the journal 73 in the housing by thrusting against the inboard bearing 75 as shown in FIG. 8.

In FIG. 9 adjustment means is provided for latch 24 through the eccentric shoulders 64 and 83. The eccentric 64 and 83 has a shoulder center line 84 which rotates about the bolt center 85, which will cause adjustment in the latch 24 according to arrow 101 dependent upon the selection of direction of rotation in the eccentric 64. The tube 13 has supporting shoulders and a hole to receive the bolt 30 which is retained by the nut 82 which clamps the eccentric 64, spring detent 80, detent 81 and latch 24 which contains the hook slot 59. The eccentric comprising 64 and 83 in FIG. 9 provides linear adjustment which removes the looseness in the folding joints when properly adjusted when the bicycle is unfolded and ridden. The eccentric is preset and preadjusted prior to locking and unlocking the latches.

As shown in FIGS. 3, 3A, 4, and 4A the girl's folding bicycle is made possible by the unique design configuration and assembly of the fittings 21 and 23 in FIGS. 3 and 3A and fittings 26 and 25 in FIGS. 4 and 4A which are configured to clear tube 12 which is a part of the frame assembly, tubes 13, 14, 7, and 12.

Additionally in these FIGS. 3A and 4A are shown the detents 81 which safely secure the latches 22 and 34 from inadvertently releasing which can be responsible for very serious accidents. The leaf spring 80 provides the spring force to retain the detent 81 in the hole in latch 24 in FIG. 9. The detents 81 by means of spring 80 engage the cavities 88 shown in FIGS. 3A and 4A and retain the latches 22 and 24 securely in the locked position when the forks are unfolded. A similar detent retains the latch 18 in FIG. 2 on the front fork. The leaf spring 80 supporting the detent 81 in FIG. 9 is clamped to the latch 24 by means of the shoulder of the eccentric 64. The spring force exerted by said leaf spring 80 causes detent 81 to protrude thru latches 22 & 24 and to engage the receptacle cavities 88 shown in FIGS. 3A and 4A and a similar receptacle cavity in FIG. 2 which is shown but not numerically identified.

Without further description it is believed that the advantages of the present invention over the prior art is apparent, and while only two embodiments of the same are illustrated, it is to be expressly understood that the same is not limited thereby as various changes may be made in combination and arrangement of parts illustrated, as will likely appear to others and those skilled in the art. It is to be understood that these together with other variations in details are anticipated by the appended claims.

What I claim is:

1. A folding bicycle frame foldable on two axes for tandem riders comprising a front wheel fork assembly, a frame assembly with a rider's seat support, and a rear wheel fork assembly with a pedal crank housing, the rear wheel fork assembly having a lower folding hinge forward of the pedal crank housing attaching the lower rear fork assembly and an upper folding hinge adjacent and aft of the rider's seat support on the frame assembly attaching the upper end of the rear fork assembly to the frame assembly, the frame assembly having rear hinge means to interconnect with the hinges of the upper and lower rear forks and having forward hinge means to connect to the front wheel fork, the front wheel fork assembly having a folding hinge above the wheel and below the frame assembly having a hinge axis means on the said fork assembly to permit the front wheel with the rear wheel to fold substantially side by side with the frame assembly between the wheels, seat means and tandem pedal means for a tandem rider comprising a forward seat means and an aft seat means, pivot support means at the aft seat on a level for forward folding of the seat over the forward seat when the bicycle is folded, a pair of aft individual pedal cranks and individual pedal crank support housing means supporting the aft pedal cranks aft of the forward pedal crank housing and forward of the rear wheel axle with the aft pedal crank support housings located to permit the rear wheel to rotate between the said rear pedal crank support housings, interconnecting driving means from the rear pedal cranks to the forward pedal crank to deliver driving torque to the front pedal crank and the rear wheel generated by the tandem rider in the tandem seat.

2. A folding tandem bicycle foldable on two axes comprising a folding rear fork assembly, a frame body assembly, and a folding front fork assembly, the folding rear fork assembly comprising a lower fork assembly supporting a pedal crank housing an an upper fork assembly attached to the said lower fork assembly, an upper hinge means attached to the upper fork assembly, and a lower hinge means attached to the lower fork assembly, said upper and lower hinge means to provide hinging axes on the lower and upper rear wheel forks to fold the rear wheel, the frame body assembly having complementary upper and lower rear hinge means connecting to the upper and lower rear fork hinge means for folding the rear wheels, seat support means on the frame assembly forward of the said hinges, means forward on the frame assembly to support the front wheel fork, the folding front wheel fork assembly comprising a wheel fork assembly and hinging means above the wheel, the front wheel fork assembly folding axis and the rear wheel fork folding axes being substantially 90° to each other permitting the front and rear wheels to fold substantially side by side with the frame assembly between the wheels, locking means to securely engage the front and rear fork assemblies in the unfolded configuration when the bicycle is ridden, a forward rider's seat means attached to said frame body assembly and a tandem rider's seat means for a second rider, a forward set of pedals and a forward pedal crank and a tandem set of pedals and pedal cranks for a tandem rider, the tandem pair of pedals and pedal cranks comprising individual pedal crank housing means supported by the lower fork assembly forward of the rear wheel axle and permitting the rear wheel to rotate between the rear pair of pedal crank housing means, interconnecting driving means from the rear pedal cranks to the forward pedal crank to synchronize the rear pedals and to provide means to deliver the driving torque to the rear wheel from the rider in the rear seat.

3. A folding tandem bicycle foldable on two axes comprising a front wheel fork assembly, a frame body assembly with a rider's seat support, and a rear fork assembly with a pedal crank housing, the rear fork assembly having a lower folding hinge forward of the pedal crank housing attaching the lower end of the rear fork assembly to the frame body assembly and an upper folding hinge adjacent and aft of the rider's seat support attaching the upper end of the rear fork assembly to the frame body assembly, the frame body assembly having hinge means aft of the rear seat support interconnecting the rear fork assembly and having forward support means for the front fork assembly, the front wheel fork assembly having a folding hinge means above the wheel and below the frame body assembly to permit the front wheel with the rear wheel to fold substantially side by side with the frame body assembly between the wheels, a tandem seat means and a tandem pedal means for a tandem rider, the tandem pedal means comprising a pair of individual pedal crank housings supporting individual pedal cranks located aft of the forward pedal crank and forward of the rear wheel axle to permit the rear wheel to rotate between the aft pedal crank housings, interconnecting driving means from the rear pedal cranks to the forward pedal crank to synchronize the individual rear pedals and to deliver the driving torque to the rear wheel generated by the tandem rider in the tandem seat.

* * * * *